Aug. 22, 1939.    J. F. THOMPSON    2,170,583
CAMERA
Filed March 17, 1939    2 Sheets-Sheet 1
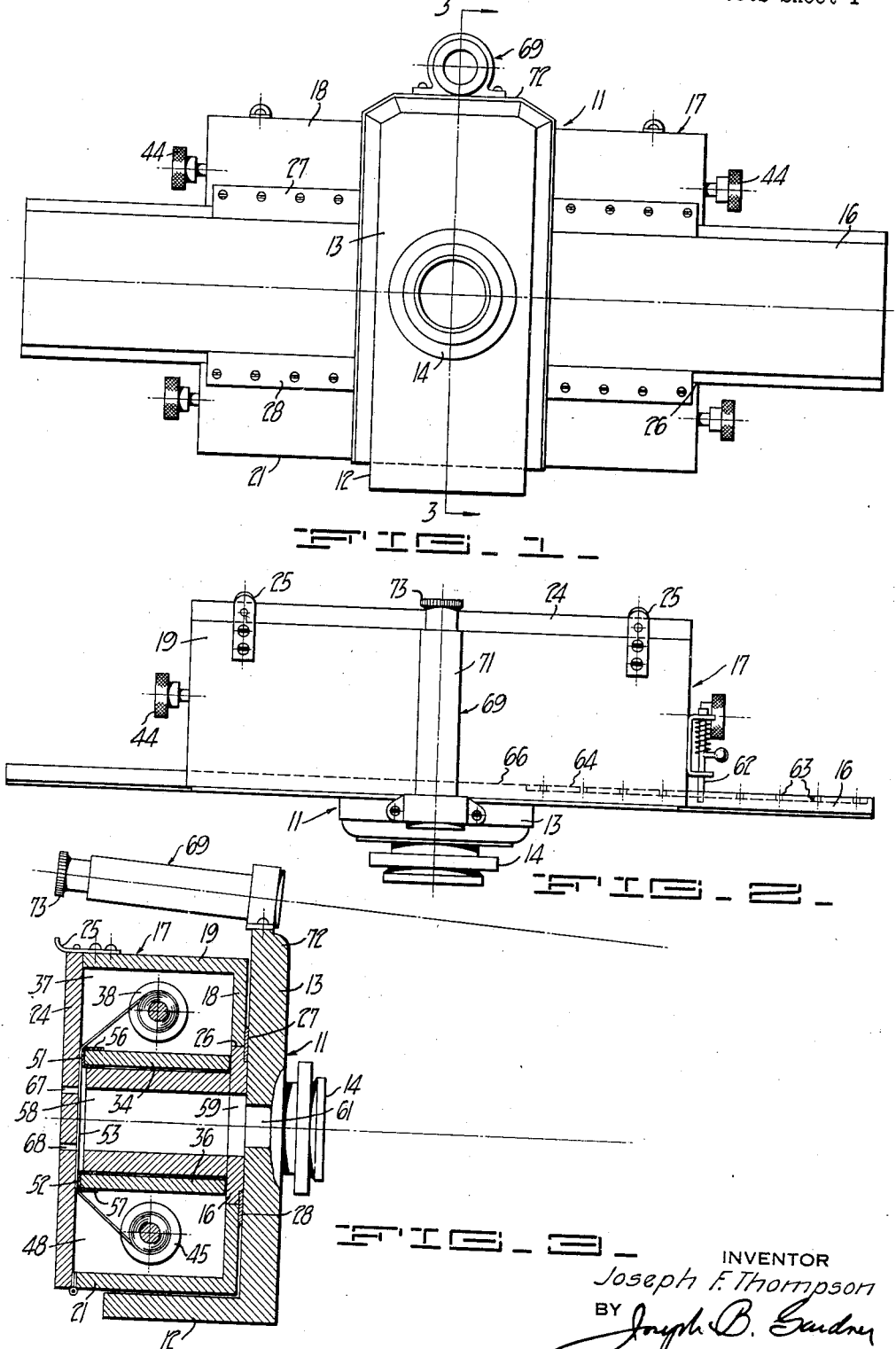

Aug. 22, 1939.  J. F. THOMPSON  2,170,583
CAMERA
Filed March 17, 1939  2 Sheets-Sheet 2
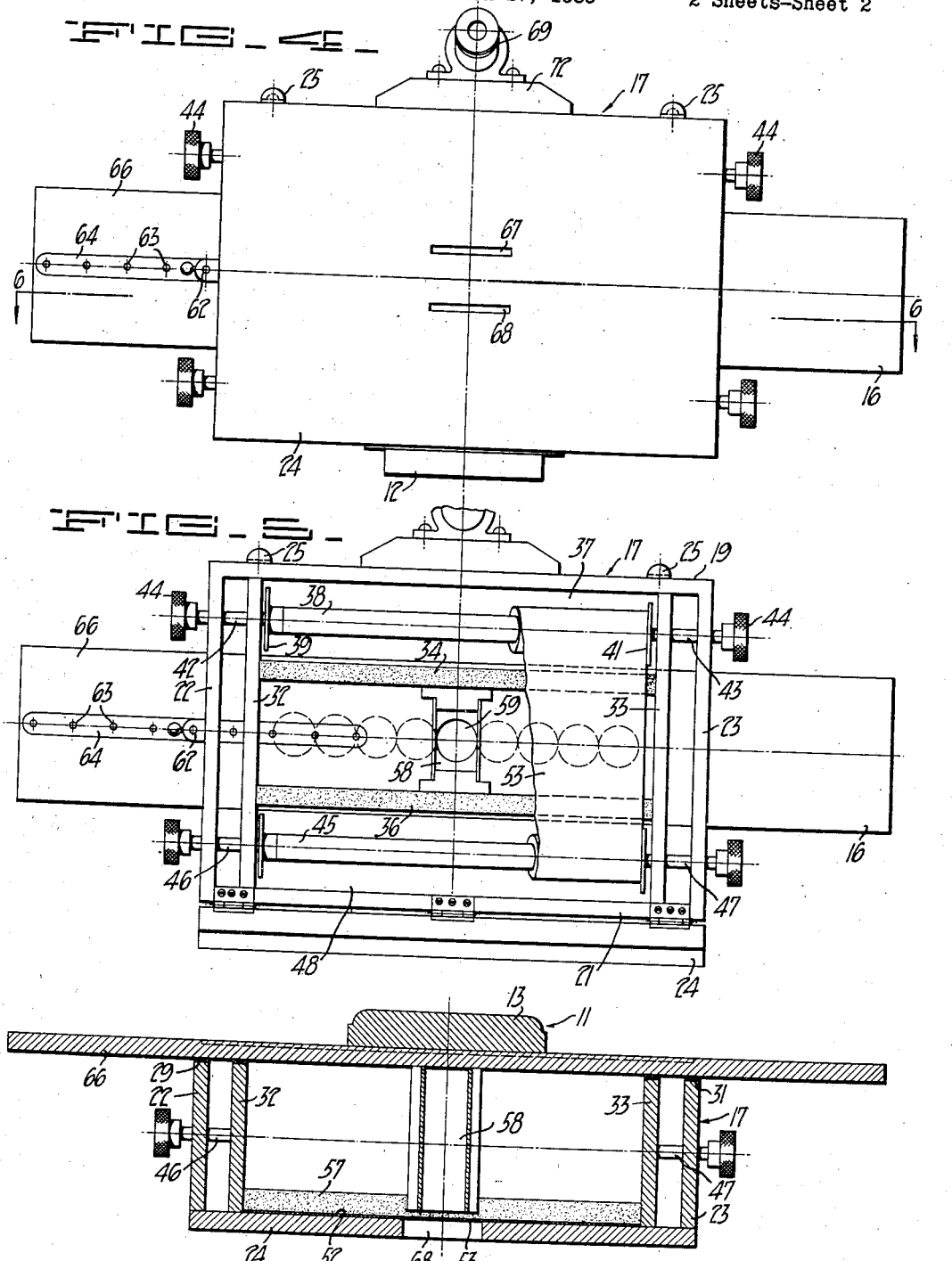

Patented Aug. 22, 1939

2,170,583

UNITED STATES PATENT OFFICE 2,170,583

CAMERA

Joseph F. Thompson, San Leandro, Calif.

Application March 17, 1939, Serial No. 262,384

3 Claims. (Cl. 95—37)

The invention relates to cameras and more particularly to cameras adapted for taking of a relatively large number of small size pictures.

An object of the invention is to provide a camera of the character described which will use a relatively large size film and which will provide for the exposing of a plurality of pictures in side-by-side relation on said film and which will further provide for a relative movement of both the film and the light aperture relative to the film.

Another object of the invention is to provide a camera of the character above in which the lens mounting is arranged for movement relative to the film casing and in which the supporting and moving structure is so designed as to keep the interior of the film casing perfectly dark and unexposed to any stray light sources.

A further object of the invention is to provide a camera of the character above in which the several exposures on the film may be precisely positioned without danger of overlapping of the several exposures and wherein the relative movement of the camera parts for effecting the several exposures may be accomplished by the operator with ease and simplicity.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a front elevation of a camera constructed in accordance with the present invention.

Figure 2 is a plan view of the camera.

Figure 3 is a vertical sectional view of the camera taken substantially on the plane of line 3—3 of Figure 1.

Figure 4 is a rear elevation of the camera.

Figure 5 is a rear elevation of the camera similar to Figure 4, but shown with the back cover of the camera in open position.

Figure 6 is a horizontal sectional view of the camera taken substantially on the plane of line 6—6 of Figure 4.

The camera of the present invention comprises briefly a film casing and film holding means mounted within the casing for moving the film across the interior of the casing and means providing a light aperture movably carried relative to said casing for moving of the aperture across the casing at substantially right angles to the direction of movement of the film, so as to provide for the exposing of successive portions of the film widthwise thereof and for a longitudinal movement of the film to position a fresh widthwise portion for exposure. In this manner, as will be understood, a plurality of pictures may be registered on the film widthwise thereof and upon exposure of the full width of the film, the latter may be displaced to position an unexposed transverse portion of the film for exposure.

Referring more specifically to the accompanying drawings, the camera therein depicted comprises, a support 11 composed of a base plate 12 adapted for mounting on a tripod or the like and a vertical front member 13. The latter carries a lens and shutter mechanism 14 which is mounted in registration with an opening through the member 13. Fixedly secured to the member 13 at the rear side thereof is an elongated slide member 16 which as here shown, extends transversely or horizontally to the upright member 13.

The camera is further composed of a film casing 17, here in the form of a rectangular box having a front wall 18, top and bottom walls 19 and 21, end walls 22 and 23, and a rear wall 24, the latter in the present instance being hinged at its lower end to the bottom wall 21 to enable a movement of the rear wall into and from a position closing the casing. Spring latches 25 may be mounted on the top wall for detachably locking the rear wall in closed position. The front wall 18 is formed with a transverse horizontal slot 26 which slidably receives the elongated horizontal member 16. A pair of straps 27 and 28 may be secured to the front wall in overhanging relation to the member 16, so as to retain the member in the slot. Preferably, the member 16 is fitted into the slot in such manner as to completely fill the same and exclude any light from entering the interior of the casing. Padding 29 and 31 may be provided on the front faces of the end walls 22 and 23 at the slot for sealing the slide member 16 in the slot.

The interior of the casing is provided with a pair of inside end walls 32 and 33 between which are mounted a pair of vertically spaced horizontal walls 34 and 36. Mounted in the space 37 between the wall 34 and the top 19 is a film spool 38 which is detachably secured at its opposite ends 39 and 41 to film winding dogs 42 and 43, which extend from the opposite ends of the space 37 endwise through the walls 32 and 33, and outwardly through the end walls 22 and 23, and are provided at their outer extremity with knurled hand wheels 44 to facilitate rotation of the dogs and spool. A film spool 44 is similarly positioned as by dogs 46 and 47 in the compartment 48 defined between the lower interior wall 16 and the bottom wall 21 of the film casing. In accordance with the above construction, film 49 carried on the upper spool 38 is drawn rearwardly behind the ends 51 and 52 of the walls 34 and 36 and between such ends and the rear wall 24 and threaded onto the lower spool 44, so as to position a strip portion 53 of the film vertically across the open rear end of the compartment 54 formed between the walls 34 and 36 for exposure of light images at various horizontally spaced positions on said strip. Preferably, padding 56, 57 is provided on the ends 51 and 52 to provide a soft sliding support for the film and for sealing the interior compartment against stray light.

A light chamber 58 formed as a small rectangular casing is connected to the horizontal slide 16 in registration with an opening 59 provided therein in alignment with an opening 61 in the front piece 13 and the lens axis. This casing preferably extends for substantially the full width between the walls 34 and 36 and is slidably carried between such walls in the compartment 54. The rear end of the casing is open, as here shown, so as to expose the light images passing through the chamber directly on the film strip 54. The function of the chamber 58 is to confine the light images therein so that the exposure on the film will be precisely confined to the area of the rear end of the chamber. In this manner a plurality of pictures may be exposed on the film strip 54 by moving the front slide and the chamber to various horizontally spaced positions relative to the film strip. To facilitate the proper positioning of the chamber relative to the film so as to properly space the pictures to be recorded on the film, I provide a spring pressed detent member 62 on the end wall 23 which engages forwardly into a plurality of horizontally spaced openings 63 provided in an elongated strip or plate 64 carried in the rear face 66 of the slide member 16. In shifting the casing on the support, the detent is retracted rearwardly to disengage one of the openings 63 and the casing moved laterally relative to the slide member 16 until the detent engages in a laterally spaced opening 63.

In order to provide a proper vertical adjustment of the film, so as to dispose a fresh unexposed strip of film across the rear of the chamber 58, I preferably provide the rear wall 24 with a pair of vertically spaced marking slots 67 and 68, which are spaced vertically from each other by a distance approximately equal to the height of the picture to be exposed. In this manner after the complete width of the film strip has been used, the operator may mark the rear side of the film through the slot 67 and then roll the film down until such mark registers with slot 68.

In order to expedite the use of the camera, I provide a range finder 69 which, as here shown, is in the form of a small telescope 71 which is conveniently mounted at the top 72 of the upright supporting member 13. Preferably, the axis of the telescope is inclined downwardly so as to intersect the axis of the lens at approximately the focal distance of the lens. For convenience the barrel of the telescope is preferably supported with the majority of its length extending rearwardly from the front piece 13 so as to dispose the eye-piece 73 of the finder approximately at the rear of the casing.

I claim:

1. A camera comprising, a support having a base plate adapted for mounting on a tripod or the like and a vertically disposed member secured thereto, an elongated horizontal member secured to said vertical member, lens and shutter means carried by said vertical member, a casing having a front wall formed with a horizontal slot slidably receiving said horizontal member, means for holding said horizontal member in said slot for slidably supporting said casing on said horizontal member and for sealing light from said slot, a light chamber secured to said horizontal member in alignment with said lens and extending into said casing and having an open interior rear end, and film spools mounted in said casing above and below said slot and adapted for support of a roll of film in said casing with a part of said film extending across the interior end of said chamber and for movement of said film vertically across said interior chamber end.

2. A camera comprising, a support having a base plate adapted for mounting on a tripod or the like and a vertically disposed member secured thereto, an elongated horizontal member secured to said vertical member, lens and shutter means carried by said vertical member, a casing having a front wall formed with a horizontal slot slidably receiving said horizontal member, means for holding said horizontal member in said slot for slidably supporting said casing on said horizontal member and for sealing light from said slot, said casing being provided with a pair of horizontal vertically spaced interior walls extending from said front wall to adjacent the rear wall of the casing, a light chamber secured to said horizontal member in alignment with said lens and extending into said casing and having an open interior rear end and slidably engaged between said interior walls, a film spool mounted in said casing between the upper of said interior walls and the top wall of the casing, a film spool mounted in said casing between the lower of said interior walls and the bottom wall of said casing, said spools being adapted for support of a roll of film in said casing with a part of said film extending across the rear end of said light chamber and for movement of said film vertically across said light chamber, the rear wall of said casing being pivotally mounted on said casing for movement to and from a closed position, and padding means mounted on the rear sides of said interior walls for engagement with said rear wall.

3. A camera comprising a support adapted for mounting on a tripod or the like and including a vertically disposed member, an elongated horizontal member secured to said vertical member, lens and shutter means mounted at the juncture of said members, a casing having a front wall formed with a horizontal slot and being slidably attached to said horizontal member with the latter covering said slot for sealing light from said slot, said casing being provided with a pair of horizontal vertically spaced guides spaced from the rear wall of the casing, a light chamber secured to said members in alignment with said lens and extending into said casing opposite said slot and having an open interior rear end located between said interior guides, a film spool mounted in said casing between the upper end of said interior guides and the top wall of the casing, a film spool mounted in said casing between the lower of said interior guides and the bottom wall of said casing, said spools being adapted for support of a roll of film in said casing with a part of said film extending across the rear end of said light chamber and for movement of said film vertically across said light chamber, the rear wall of said casing being mounted for movement to and from a closed position, a detent member movably carried by said casing, said horizontal member providing a plurality of longitudinally spaced portions positioned to engage and interlock with said detent member.

JOSEPH F. THOMPSON.